United States Patent
Di Simone

(10) Patent No.: US 7,128,564 B2
(45) Date of Patent: Oct. 31, 2006

(54) SIMPLIFIED IN-MOLD ARTICLE HANDLING SYSTEM AND A METHOD FOR HANDLING MOLDED ARTICLES

(75) Inventor: John Di Simone, Woodbridge (CA)

(73) Assignee: Husky Injection Molding Systems Ltd.(CA)

( * ) Notice: Subject to any disclaimer, the term of this patent is extended or adjusted under 35 U.S.C. 154(b) by 504 days.

(21) Appl. No.: 10/732,449

(22) Filed: Dec. 11, 2003

(65) Prior Publication Data

US 2005/0127569 A1   Jun. 16, 2005

(51) Int. Cl.
B29C 45/42 (2006.01)

(52) U.S. Cl. ........................... 425/556; 425/444

(58) Field of Classification Search .......... 425/556, 425/444
See application file for complete search history.

(56) References Cited

U.S. PATENT DOCUMENTS

| | | | | |
|---|---|---|---|---|
| 3,910,748 | A * | 10/1975 | Kopernik | 425/444 |
| 4,204,824 | A * | 5/1980 | Paradis | 425/436 R |
| 4,340,352 | A | 7/1982 | Hayberg | 425/517 |
| 4,351,630 | A | 9/1982 | Hayberg et al. | 425/517 |
| 4,589,840 | A | 5/1986 | Schad | 425/556 |
| 4,616,992 | A | 10/1986 | Oles | 425/503 |
| 4,679,997 | A | 7/1987 | Plenzler et al. | 425/126 |
| 4,784,592 | A | 11/1988 | Dromigny | 425/121 |
| 4,787,841 | A * | 11/1988 | Simon | 425/556 |
| RE33,237 | E | 6/1990 | Delfer, III | 425/547 |
| 4,976,603 | A | 12/1990 | Di Simone | 425/556 |
| 5,037,597 | A | 8/1991 | McGinley et al. | 264/238 |
| 5,234,328 | A | 8/1993 | Willson et al. | 425/139 |
| 5,518,387 | A | 5/1996 | Di Simone | 425/139 |
| 5,520,876 | A | 5/1996 | Döbler | 264/511 |
| 5,527,173 | A | 6/1996 | Miller et al. | 425/126.1 |
| 5,709,833 | A | 1/1998 | Simone | 264/328.1 |
| 6,334,766 | B1 * | 1/2002 | McCormick | 425/165 |
| RE37,827 | E | 9/2002 | Schad | 425/595 |
| 6,450,797 | B1 * | 9/2002 | Joseph | 425/556 |
| 6,461,141 | B1 * | 10/2002 | Harrison et al. | 425/556 |
| 6,607,375 | B1 * | 8/2003 | Takada et al. | 425/526 |
| 2002/0127298 | A1 * | 9/2002 | Harrison et al. | 425/DIG. 5 |

(Continued)

OTHER PUBLICATIONS

Linear Guidance Systems, INA Online Product Catalog [online], INA-FAG, Dec. 10, 2002 [retrieved on Oct. 7, 2004]. Retrieved from the internet: <URL: http://medias.ina.de/medias/en!hp.ec.br/MKLF..%20ZR;atjNtmwnm5E9.

(Continued)

Primary Examiner—Yogendra N. Gupta
Assistant Examiner—Emmanuel S. Luk
(74) Attorney, Agent, or Firm—Katten Muchin Rosenman LLP

(57) ABSTRACT

An in-mold system and method for handling molded articles. An in-mold lid handling system provides a slide that is operable to translate laterally across a molding face of an injection mold to perform a first operation on, or to retrieve a plurality of molded articles from, a column of molding cavities and to thereafter retreat to an outboard position for a second operation, or to transfer the molded articles to drop chutes. The driving means for the slide include a first and a second transmission attached to the ends thereof. The transmissions operate on the same basic principle wherein at least one belt contained therein is configured along a path defined by a plurality of guides, the path including a plurality of segments defined between the guides, and the at least one belt being operable along the path between two positions, wherein the slide is attached to various suitably arranged path segments and is thereby driven between the inboard and the outboard positions respectively.

38 Claims, 9 Drawing Sheets

U.S. PATENT DOCUMENTS

2002/0146483 A1* 10/2002 Mai et al. .................. 425/556

OTHER PUBLICATIONS

Linear Guidance Systems, INA Online Product Catalog [online], INA-FAG, Dec. 10, 2002 [retrieved on Oct. 7, 2004]. Retrieved from the internet: <URL: http://medias.ina.de/medias/en!hp.ec.br/MKKUSE..ZR;atjNtmwnm5E9.

Linear Actuators of Tandem Design, [online] INA Press Office, May 2, 1999, [retrieved on Oct. 7, 2004]. Retrieved from the internet: <URL: http://medias.ina.de/medias/en!viewpress/19990502/8720-05_us_us;aTCKtewg753b.

MAI Supplement to INA publication ALE, INA, Dec. 10, 2002 (3 pages).

* cited by examiner

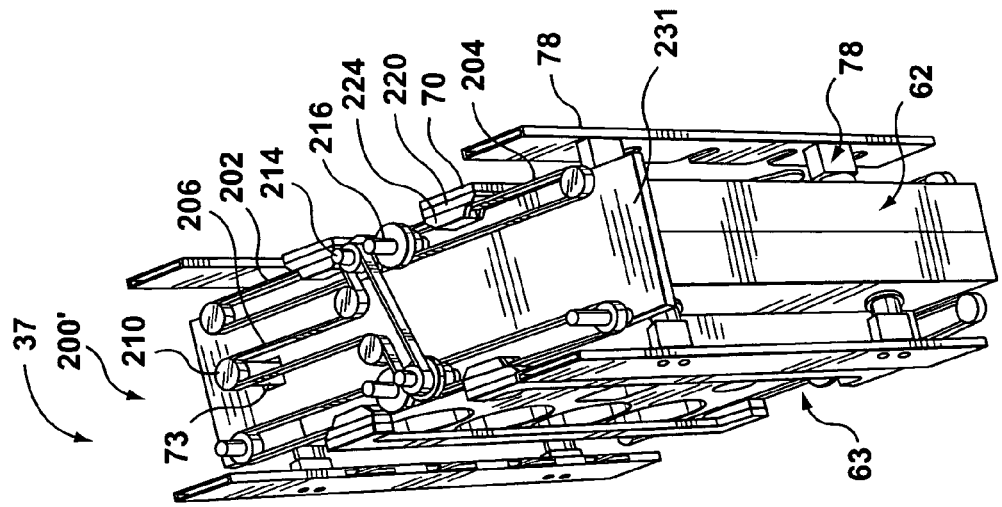
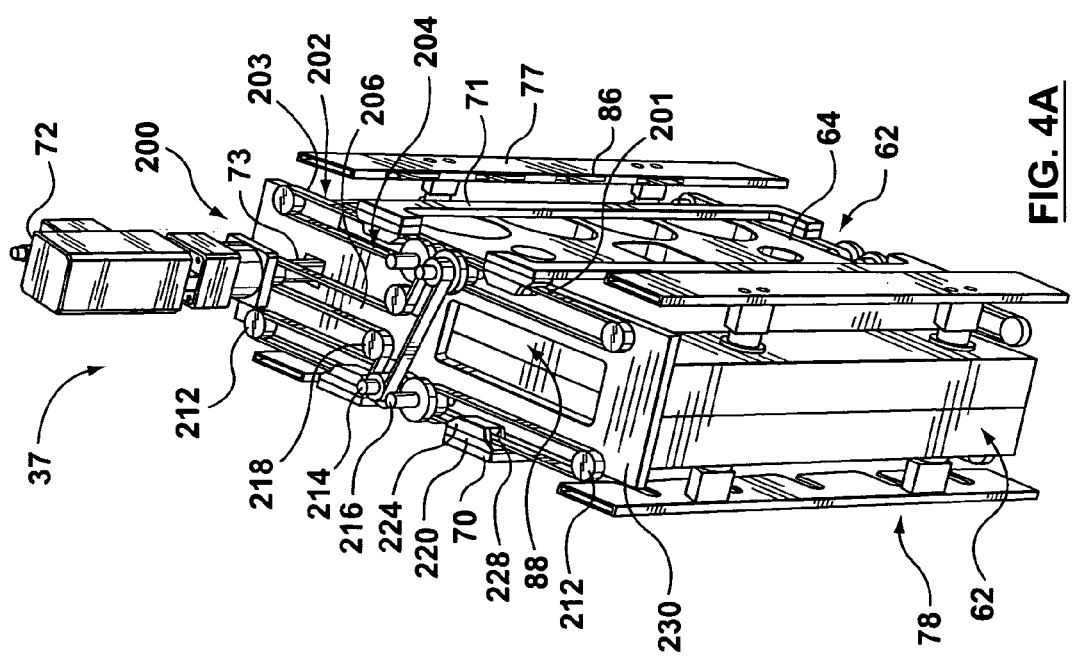
FIG. 4A
FIG. 4B

US 7,128,564 B2

SIMPLIFIED IN-MOLD ARTICLE HANDLING SYSTEM AND A METHOD FOR HANDLING MOLDED ARTICLES

BACKGROUND OF INVENTION

1. Field of the Invention

The present invention relates, generally, to a simplified in-mold article handling system, and more particularly, but not exclusively, the invention relates to an in-mold handling system that includes a simplified transmission for driving a slide across a molding face of an injection mold, between an inboard and an outboard position, for the handling of injection molded articles, such as lids, between their molding cavities and a drop chute, respectively.

2. Background Information

The advantages provided by an in-mold article handling system in accordance with the present invention are made apparent, for example, when incorporated into an injection molding system for the production of container lids. Accordingly, and without implying any such limitation on the general utility of the handling system, the in-mold handling system of the present invention will hereinafter be described within the context of an injection molding lid molding system.

Referring to FIG. 1, a lid molding system is shown that includes an injection molding machine clamp unit 34 with a four-level lid stack mold 36 mounted therein between a stationary platen 50 and a moving platen 52. The injection molding machine, clamp unit 34, and mold 36 being operable as commonly known. The clamp unit is further shown as including a clamp assembly 54 for operating the injection mold 36 between an open, closed, and clamped configuration, as generally described in U.S. Pat. No. Re. 37,827. The injection mold 36 is configured for high-volume, efficient lid production and accordingly includes an in-mold lid handling system 59. The in-mold lid handling system 59 is integrated into the injection molding process for receiving and transferring the lids (not shown) from the injection mold to a series of drop chutes, respectively, for the simple integration of an auxiliary processes, such as lid conveyance, stacking, and packaging.

The auxiliary process may include, as shown in FIG. 1, four lanes of lid conveyors 91, 92, 93, 94 with each lid conveyor lane dedicated to servicing a pair of drop chutes 77 provided to service each molding face 81, 82, 83, 84. Each lane of lid conveyors 91, 92, 93, 94 are positioned beneath the injection molding machine clamp unit 34 to align and engage with the corresponding drop chutes 77 in a mold closed position. The lid conveyors 91, 92, 93, and 94 may then subsequently transfer the lids (not shown) to a lid packing station 80 positioned behind the injection molding machine clamp unit 34.

The lid packing station may include a series of spin-bar lid stackers 96, one for each lane of lid conveyor 91, 92, 93, 94, for stacking the lids (not shown), thereafter the stacked lids 14 are transferred by means of a transfer robot 97 to a bagger 98 that bags and ejects the packaged stack of lids 16 onto a conveyor 99 for downstream handling into boxes.

In further detail, the injection mold 36 includes four molding faces 81, 82, 83, 84, that each include a pair of parallel rows of molding cavities. Each molding face 81, 82, 83, 84 is provided between a core plate assembly 60, 61 and a complementary cavity plate assembly 63. The cavity plate assembly 63 is shown in more detail with reference to FIG. 2. The core plate assemblies 60, 61 are provided by a center core plate assembly 61, and two single molding face core plate assemblies 60 mounted on the stationary and moving platens respectively. The faces of the core plate assemblies 60, 61, adjacent the molding faces 81, 82, 83, & 84, include core molding inserts 65 that provide a portion of the molding cavities. The cavity plate assemblies 63, adjacent the molding faces 81, 82, 83, & 84, include cavity molding inserts 67 that provide a complementary portion of the molding cavities to those of the core molding insert 65. The core and cavity plate assemblies are shown arranged such that a pair of cavity plate assemblies 63, henceforth referred to as a first and a second cavity plate assembly 63, are provided between each pair of the center core plate assembly 61 and a core plate assembly 60. The first and second cavity plate assemblies 63 are mounted on either side of a common hot runner 62. Each hot runner 62, of which there are two in a four-level mold, include a sprue bar 58, as shown in FIG. 2, for coupling the hot runner 62 to an injection unit (not shown) for supporting a flow of molding material, as is commonly known. For the sake of reference, the first and second cavity plate assemblies 63 and their hot runner 62 may collectively be referred to as a mold hot section 37.

Each molding face is serviced by the in-mold lid handling system 59. Accordingly, and with reference to FIG. 1, each mold hot section 37 includes a portion of the in-mold lid handling system 59 attached to its hot runner assembly 62. The in-mold lid handling system 59 includes a pair of vertically oriented slides 70 adjacent each molding face 81, 82, 83, 84 that are operable to translate laterally there across to retrieve a plurality of lids (not shown) from the corresponding vertical column of core molding inserts 65 and to thereafter transport the lids (not shown) to drop chutes 77. As shown in FIG. 2, each slide 70 is driven and guided by a dedicated transmission and servo motor 72 that are mounted to the hot runner 62. The slide 70 is typically a light weight rigid rail made from plastic or aluminum with a plurality of molded article retention devices, such as suction cups 71, mounted to a face thereof for engaging the lids 12 for transport. Each slide 70 may further include a vacuum channel (not shown) for connecting the suction cups 71 to a controllable vacuum source (not shown) that provides a means to controllably couple and decouple the lid to the suction cups 71.

As mentioned hereinbefore, the in-mold lid handling system 59 also includes a pair of drop chutes 77 adjacent each cavity plate assembly 63. With reference to FIG. 1, each pair of drop chutes 77 are shown mounted to a corresponding outer face of the hot runner 62 and positioned on either side of, and generally adjacent to, the cavity plate assemblies 63 in a substantially vertical orientation. With reference to FIG. 5, a typical drop chute 77 is shown. The drop chute 77 is a slender 'U'-shaped channel with its open side facing a side edge of the lids 12 (not shown), that are being held on a slide 70, such that when the lids are translated to the outboard position they enter into the open side of the drop chute channel, as shown in FIG. 7. The drop chutes 77 further include guide cutouts 86 to provide clearance for the suction cups 71 of the slides 70 such that the lids 12 can be positioned generally completely within the drop chutes 77 before they are released from the suction cups 71.

With reference to FIG. 2, the in-mold lid handling system 59 is shown installed on a mold hot section for servicing a molding face 82, as shown in the direction 2—2 in FIG. 1, wherein each slide 70 is slidably connected to a face of the hot runner 62 by a dedicated transmission (i.e. drive shaft 73, driving gear 75, rack/linear rail 76, and linear bearing 74) and servo motor 72. Accordingly, each slide 70 includes a rack/linear rail 76 fastened at its ends, the rack/linear rails being oriented relative to the slide 70 to support a lateral translation of the slide 70 that is generally perpendicular to its longitudinal axis. The rack/linear rails themselves ride within linear bearings 74 that are attached to the front face of the hot runner 62. A rotational drive shaft 73, that includes a pair of driving gears 75 for engaging the rack portion of the rack/linear rail, is provided for driving each slide 70. The drive shaft being rotated, in use, by a dedicated servo motor 72. The detailed construction and operation of such an in-mold molded article handing system is provided in co-pending U.S. patent application Ser. No. 10/287,809. Of course, alternative in-mold lid handling systems could also have been used, such as the swing chutes described in U.S. Pat. No. 5,518,387.

In operation, the steps for retrieving and transferring the lids 12 from the mold 36 includes: laterally positioning of the slides 70 into an inboard position, as shown at reference symbol A in FIG. 2, such that the suction cups 71 are positioned in front of an exposed front face of the plurality of lids 12 held on the core molding inserts 65 (not shown); ejecting the plurality of lids 12 from the core molding inserts 65 onto the corresponding plurality of suction cups 71, the ejection action being provided by a plurality of mold stripper rings 65 (not shown) provided on the core plate assemblies; laterally positioning of the slides 70 into an outboard position, as shown at reference symbol B in FIG. 2, wherein the lids held thereon are positioned within a drop chute 77 (not shown); the lids 12 are thereafter released from the suction cups 72, for example by reversing the vacuum source to blow through the suction cups 71, and thereafter the lids 12 travel down within the channel of the drop chute, under the influence of gravity, for subsequent ejection into the auxiliary processes.

While the heretofore known in-mold lid handling systems 59 have succeeded in improving the efficiency and flexibility of lid molding systems, there remains the challenge of reducing the cost and complexity of such handling systems. Furthermore, the structural configuration and layout of many of such in-mold handling systems have introduced undesirable, and otherwise unnecessary, complexities and limitations of their own, that may include: complexities relating to mold installation; and restrictions relating to molding cavity pitch spacing and maximum mold cavitation (i.e. the number of molding cavities on the molding face).

In particular, there is a lot of expense associated with having to provide a dedicated servo motor 72 to drive each and every slide 70. With reference to FIG. 1, the four-level stack mold with its four molding faces 81, 82, 83, & 84 and two rows of molding cavities and hence slides 70 on each molding face, therefore requires eight servo motors 72. Furthermore, the linear bearings 74 and the linear rails 76 used in the in-mold lid handling system described hereinbefore, and as shown in FIG. 2, are typically expensive high-precision elements. The foregoing is of particular concern when a large number of such components is required, as it is for example with the four-level stack mold of FIG. 1 wherein sixteen sets of linear bearings 74 and linear rails 76 are required. Furthermore, the rack/linear rails 76 are quite large and are typically made from metal (e.g. aluminum and steel) and hence will have appreciable momentum with a the high rate with which the slides 70 shuttle between the inboard and outboard positions (i.e. high moving mass) that may limit system performance.

Again with reference to FIG. 2, complexities relating to injection mold 36 installation into the injection molding machine clamp unit 34 occur whenever it is intended to install the injection mold 36 vertically between the tie bars 56 of the clamp unit 34, as is common installation practice, and wherein the horizontal tie bar 56 spacing is larger than the width or the injection mold 36 but otherwise smaller than the width of the injection mold 36 including its in-mold lid handling system 59 installed thereon, as evaluated to the outermost extent of the outward projecting rack linear rails 76 in the outboard position. In such a situation, the rack/linear rails 76, in the outboard position, would interfere with the tie bars 56 during mold installation. Accordingly, injection mold 36 installation under such conditions would require at least a partial removal of the in-mold part handling system 59 from the injection mold 36, or may dictate that the injection mold 36 be installed in smaller portions thereof such that the slides 70 can be parked in the inboard position. Such requirements incur considerable costs in terms of increased time for mold installation, and therefore lost production, and the possibility of having to employ specialized skilled for the careful removal and re-installation of the in-mold lid handling system 59. Hence, it is undesirable to have an in-mold lid handling system with laterally projecting portions thereof that extend beyond the envelope of the injection mold 36, in the mold closed position.

Again with reference to FIG. 2, the injection mold 36 cavity pitch spacing and maximum mold cavitation may be significantly restricted by the placement and space required to accommodate the transmission (i.e. linear bearings 74 and linear rails) of the in-mold lid handling system 59. For example, the vertical placement of the linear rails 76 is dictated by the tie bars 56 such that there is no interference between the two whenever the linear rails 76 are positioned in the outboard position. Accordingly, the vertical space available for the placement of molding cavities is thereby restricted.

Hence, there is a need to provide a simplified and relatively inexpensive in-mold handling system for molded article. Furthermore, there is a need for an in-mold handling system 59 that doesn't complicate injection mold 36 installation into the machine clamp unit 34, and that dictates relatively minimal restrictions relating to molding cavity pitch spacing and maximum mold cavitation.

SUMMARY OF THE INVENTION

In accordance with a first aspect of the present invention, an in-mold article handling system is provided that is configured for mounting to a first mold section. The first mold section including at least one plate assembly provided on a first side thereof. The at least one plate assembly including at least one molding cavity portion disposed therein that has an opening arranged through a front face thereof. The in-mold article handling system comprising: at least one slide provided by an elongate rail with a plurality of article retention devices configured on a front face thereof, in use, for engaging articles for transport; a first and a second transmission connected at generally opposite ends of the at least one slide, the transmissions cooperating, in use, to translate the at least one slide across a front face of the at least one plate assembly between: an inboard position, that is adjacent said at least one molding cavity portion, to perform a first operation; and an outboard position, that is laterally spaced from the front face of the at least one plate assembly, to perform a second operation; a motive means for driving the first and second transmission. The first and second transmissions each including: a frame plate; at least one flexible linking means contained therein that is configured along a path; a plurality of guides mounted to a top face of the frame plate that defines the path; the path including a plurality of path segments defined between the guides; a driving member that couples the motive means with the at least one flexible linking means for operating same, in use, along the path between a first and a second position. Wherein the at least one slide attaches to the at least one flexible linking means along one of the path segments to be driven therewith and as such, in use, when the at least one flexible linking means is operated along the path between the first and the second position the at least one slide is correspondingly operated between the inboard and the outboard positions respectively.

In accordance with a second aspect of the invention, an injection mold including at least one in-mold article handling system mounted to at least one mold section thereof is provided. The at least one mold section including at least one plate assembly provided on a first side thereof. The at least one plate assembly including at least one molding cavity portion disposed therein that has an opening arranged through a front face thereof. The in-mold article handling system comprising: at least one slide provided by an elongate rail with a plurality of article retention devices configured on a front face thereof, in use, for engaging articles for transport; a first and a second transmission connected at generally opposite ends of the at least one slide, the transmissions cooperating, in use, to translate the at least one slide across a front face of the at least one plate assembly between: an inboard position, that is adjacent said at least one molding cavity portion, to perform a first operation; and an outboard position, that is laterally spaced from the front face of the at least one plate assembly, to perform a second operation; a motive means for driving the first and second transmission the first and second transmissions each including: a frame plate; at least one flexible linking means contained therein that is configured along a path; a plurality of guides mounted to a top face of the frame plate that defines the path; the path including a plurality of path segments defined between the guides; a driving member that couples the motive means with the at least one flexible linking means for operating same, in use, along the path between a first and a second position. Wherein the at least one slide attaches to the at least one flexible linking means along one of the path segments to be driven therewith and as such, in use, when the at least one flexible linking means is operated along the path between the first and the second position the at least one slide is correspondingly operated between the inboard and the outboard positions respectively.

In accordance with a third aspect of the invention a transmission is provided for use in a in-mold article handling system. The in-mold article handling system is configured for mounting to a first mold section of a mold. The first mold section including at least one plate assembly provided on a first side thereof. The at least one plate assembly including at least one molding cavity portion disposed therein that has an opening arranged through a front face thereof. The transmission comprising: a frame plate; at least one flexible linking means contained therein that is configured along a path; a plurality of guides mounted to a top face of the frame plate that defines the path; the path including a plurality of path segments defined between the guides; a driving member that couples, in use, to a motive means with the at least one flexible linking means for operating same, in use, along the path between a first and a second position. Wherein the transmission is configured such that, in use, at least one slide attaches to the at least one flexible linking means along one of the path segments to be driven therewith and as such when the at least one flexible linking means is operated along the path between the first and the second position the at least one slide is correspondingly operated between an inboard and an outboard positions respectively.

In accordance with another aspect of the invention, a method for handling molded articles from a mold using in-mold article handling system is provided. The in-mold article handling system configured to translate at least one slide, with at least one article retention device thereon, across at least one molding face of the mold, the in-mold article handling device further including at least one drop chute. The method including the steps of:
i) laterally positioning of the at least one slide across the molding face into an inboard position such that the at least one article retention device is positioned for retrieving an article in front of an exposed front face of the plurality of molded articles held on the core molding inserts;
ii) ejecting the plurality of molded articles from the core molding inserts onto the corresponding plurality of suction cups;
iii) positioning of the drop chutes into a retracted position for receiving the molded articles being held on the slide suction cups;
iv) laterally positioning of the slides into an outboard position wherein the molded articles held thereon are positioned within a drop chute;
v) advancing the drop chutes into a forward position as the molded articles are being released from their suction cups, and thereafter the molded articles travel down within the channel of the drop chute, under the influence of gravity, for subsequent ejection into the auxiliary processes.

BRIEF DESCRIPTION OF THE DRAWINGS

Exemplary embodiments of the present invention will now be described with reference to the accompanying drawings, in which:

FIG. 4A is a perspective view, showing the top and sides of an injection mold hot section 37 including an in-mold lid handling system in accordance with a second embodiment of the present invention, the slides are shown in the inboard position;

FIG. 4B is a perspective view, showing the bottom and sides of an injection mold hot section 37 and the in-mold lid handling system of FIG. 4A;

DETAILED DESCRIPTION OF THE PRESENTLY PREFERRED EXEMPLARY Embodiments

Figure 1:
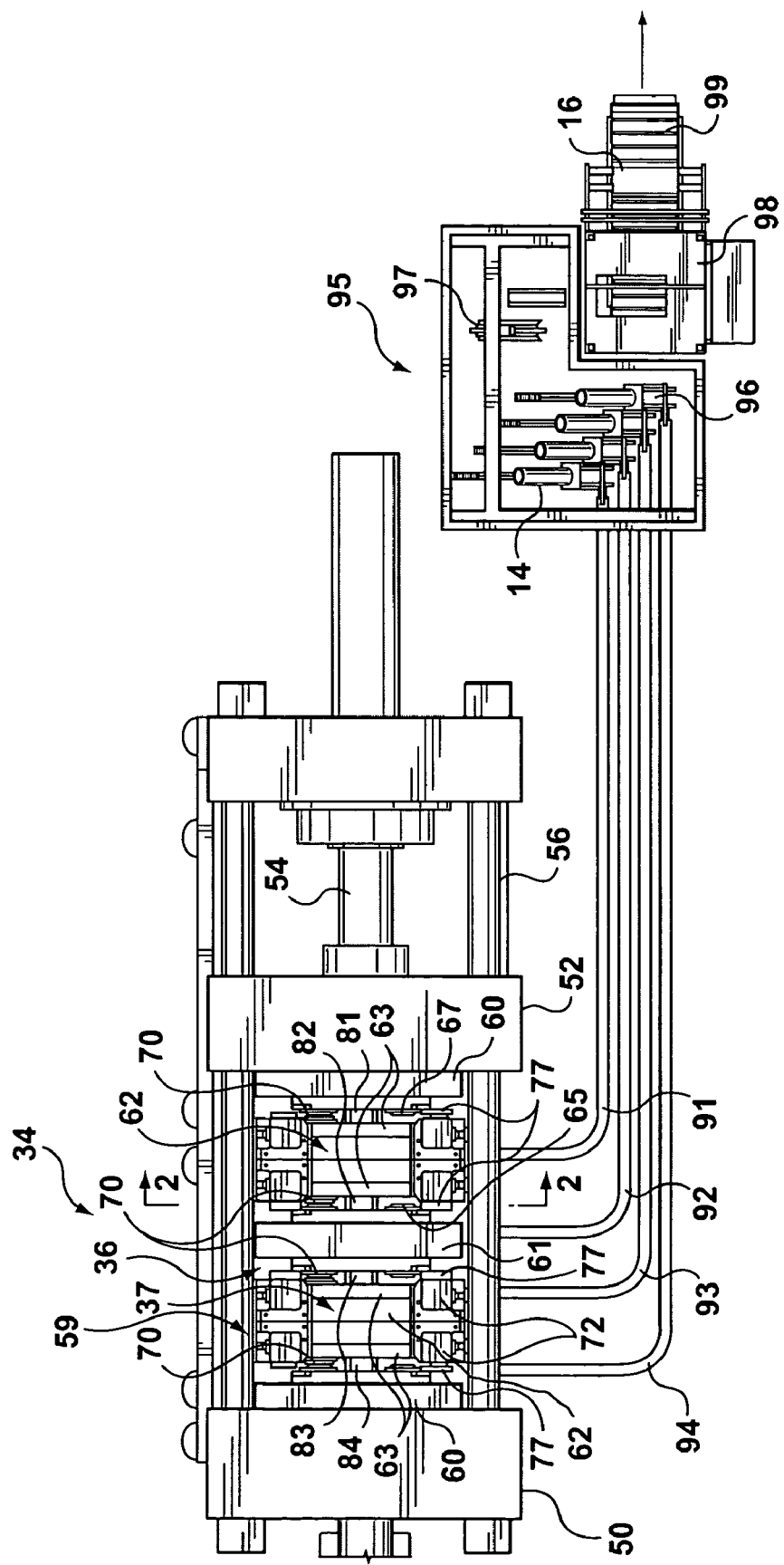
FIG. 1 is a plan view of a typical lid molding system including a four-level stack mold with an in-mold lid handling system.
Figure 2:
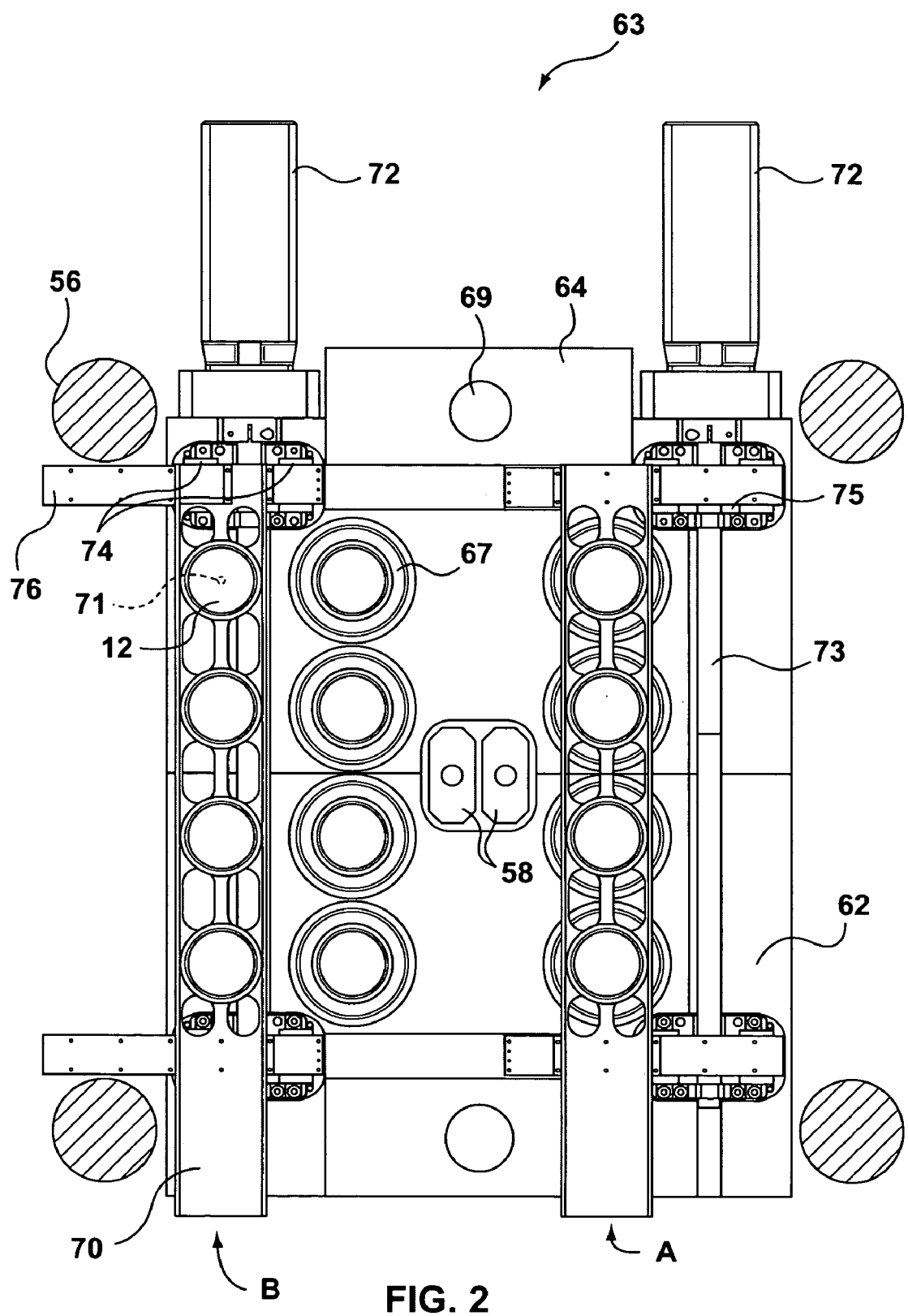
FIG. 2 is a front view of a mold hot section 37 including a known in-mold lid handling system installed thereon, the view is taken along section line 2—2 as shown in FIG. 1.

Various embodiments of the in-mold lid handling system 59 in accordance with the present invention are shown with reference to FIGS. 3A, 3B, 3C, 4A, 4B, 5, 6A, 6B & 7, and described in further detail hereinafter. Each of these embodiments of the in-mold lid handling system 59 are shown configured for installation on the mold hot runner 62 of an injection mold hot section 37, as shown in FIGS. 3A, 3B, 3C, 4A, & 4B, although those skilled in the art would understand that the in-mold lid handling system 59 could be reconfigured for mounting on the core plate assemblies 60, 61, or for use with a typical injection mold 36 with only a single molding face. Furthermore, for the sake of clarity and continuity, the configuration of the injection mold 36, and hence the slide 70 layout of the in-mold lid handling system 59, will be the same as that described hereinbefore, and as shown in FIG. 1, although those skilled in the art would understand that variations in the number of columns of molding cavities and hence the quantity of slides 70 is possible. Accordingly, the in-mold lid handling system 59 provides a pair of vertically oriented slides 70 to service the parallel columns of molding cavities (not shown) positioned on each molding face 81, 82, 83, & 84. And as with the in-mold lid handling system described hereinbefore, and as shown in FIG. 2, the slides 70 are operable to translate laterally across the molding faces 81, 82, 83, and 84 to retrieve a plurality of lids 12 from the corresponding column of core molding inserts 65 (not shown) and to thereafter transport the lids 12 to drop chutes 77. The structure of the slides 70 is essentially unchanged except for the means by which the ends of slides 70 are coupled to an upper and a lower transmission 100 & 100', 200 & 200', or 300 & 300' respectively.

The various embodiments of the transmissions 100, 100', 200, 200', 300, & 300' all operate on the same basic principle wherein at least one belt 101, 202, 204, and 301 contained therein is configured along a path defined by a plurality of guides, the path including a plurality of segments defined between the guides, and the at least one belt being operable along the path between two positions, wherein the slides 70 that are connected to various suitably arranged path segments 102 & 104, 202 & 204, and 302 & 304 are thereby driven between the inboard and the outboard positions respectively.

The upper transmissions 100, 200, or 300, and the lower transmissions 100', 200', or 300' are configured for mounting to the top and bottom faces of the hot runner 62 assembly respectively. The upper and lower transmissions are linked by a common driving shaft 73, as shown with reference to FIG. 5, the driving shaft 73 being driven by a servo motor 72. The driving shaft 73 further includes a pair of driving gears 110, the first positioned within the upper transmission 100, 200, or 300 for driving same, the second driving gear being positioned at an end of the driving shaft 73 for driving the lower transmission 100', 200', or 300'. The mechanical configuration and layout between the upper and lower transmissions 100 & 100', 200 & 200', and 300 & 300' are essentially identical. A simple variation between the upper and lower transmissions 100 & 100', 200 & 200', and 300 & 300' may be the presence, or absence, of a central mold services access cutout 170 extending therethrough. The access cutout 170 permits access to a mold services connection face 88 located on the top face of the hot runner 62, for the mounting of various connectors and manifolds (not shown) for providing mold services (i.e. electrical, air and water) to both the hot runner 62 and the cavity plate assemblies 63, and/or to a similar connection face (not shown) on the bottom of the hot runner 62 for attaching such things as mold feet, or yet again more mold services connections. For present purposes, the upper transmissions 100, 200, & 300 include the cutout 170 whereas the lower transmission 100', 200', & 300' do not. The upper and lower transmissions 100 & 100', 200 & 200', and 300 & 300' are each built upon an upper and a lower frame plate 130 & 131, 230 & 231, and 330 & 331 respectively, again the only difference between the upper and lower frame plates being that the upper frame plates 130, 230, & 330 includes a central mold services access cutout 170 whereas the lower frame plates 131, 231, 331 do not. The lower frame plates 131' and 231' are not shown such in FIG.(s) 3A, 3B, and 4A such that the transmission components of the lower transmissions 100' and 200' are made clearly visible. Similarly, the upper frame plates 130 and 230 are not shown in FIGS. 3C, and 4B such that the transmission components of the upper transmissions 100 and 200 are made clearly visible.

Advantageous aspects that are provided by each of the various embodiments of the transmissions 100, 100', 200, 200', 300, & 300' are that they enable the lid handling system 59 of the present invention to be simpler and cheaper, while avoiding the complexities and limitations of the in-mold lid handling systems described hereinbefore. In particular, none of the various embodiments of the transmissions 100, 100', 200, 200', 300, & 300' require the use of linear rails 76 or linear bearings 74 with their inherent expense, space requirements, and high moving mass. The transmissions 100, 100', 200, 200', 300, & 300' make it possible to use a single servo motor 72 to drive all of the slides 70 connected to the lid handling system 59 of each mold hot section 37. In addition, the transmissions 100, 100', 200, 200', 300, & 300' are all designed to be simply fastened to a top and to a bottom face of the mold hot section 37 leaving the front face of the cavity plate assembly 63 relatively free for optimizing the mold cavity layout and for servicing. Furthermore, the components of the transmissions 100, 100', 200, 200', 300, & 300' are all fully contained therein such that during the operation thereof none of the components project laterally outwardly, and hence there is no potential for interference with the tie bars 56 or any additional complexities relative to the injection mold 36 installation.

The construction and operation of the various embodiments of the in-mold lid handling system 59 will now be described in further detail. For the sake of efficiency, wherever a description of the construction and operation of the various embodiments of the upper transmissions 100, 200, 300 is given, it is to be understood that the construction and operation of the corresponding lower transmission 100', 200', 300' is identical except for the requirement for the mold services cutout 170, as described hereinbefore.

Figures 3A, 3B:
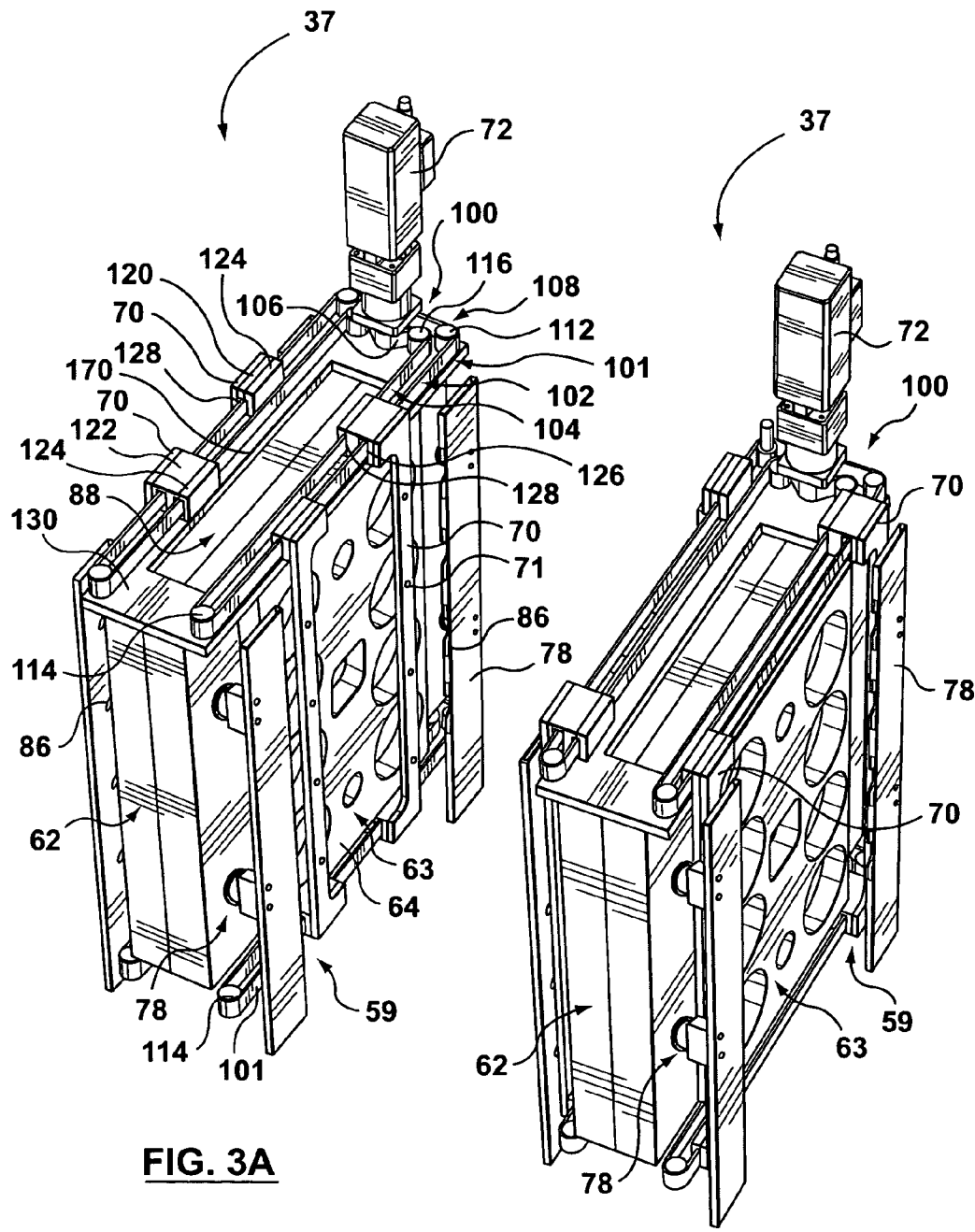
FIGS. 3A and 3B are perspective views, showing the top and sides of an injection mold hot section 37 including an in-mold lid handling system in accordance with a first embodiment of the present invention, the views differ in that the slides are shown in the inboard and outboard positions respectively.
Figure 3C:
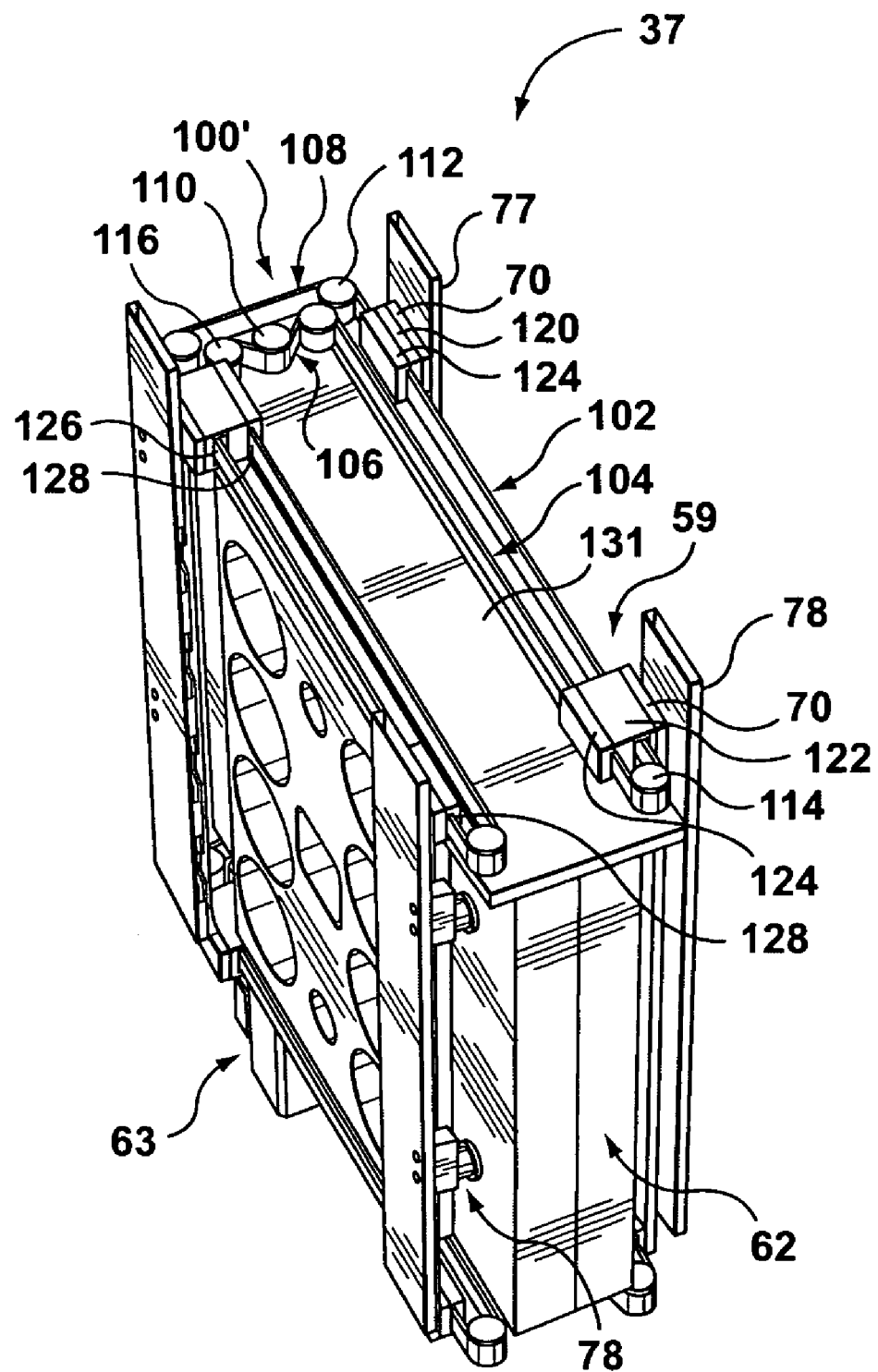
FIG. 3C is a perspective view, showing the bottom and sides of the injection mold hot section 37 and the in-mold lid handling system of FIG. 3B.

In accordance with a first embodiment of the in-mold part handling system 59, as shown in FIGS. 3A, 3B, & 3C, the handling system 59 includes an upper and a lower transmission 100, 100'. Each transmission 100, 100' includes a driving belt 101 that is arranged along a path that includes four functional path segments 102, 104, 106, and 108. In particular, the functional path segments include a forward path segment 102, a rear path segment 104, a driving path segment 106, and a return path segment 108.

The pair of slides 70 disposed adjacent each cavity plate assembly 63 must be configured to translate across a front face of the cavity plate assembly 63 between the inboard and outboard positions in mutually opposite directions. That is, the slides 70 converge towards the mold centerline to the inboard position for lid 12 retrieval, and thereafter the slides 70 diverge to the outboard positions for alignment of the lids 12 within the drop chutes 77. Accordingly, the slides 70 within each pair are attached to the forward and rear path segments 102, 104 respectively, the forward and rear path segments 102, 104 being configured to operate in generally opposite directions.

Accordingly, a forward and a rear path segment 102, 104 are provided to drive the pair of slides 70 positioned adjacent a front face of a first cavity plate assembly 63 of the mold hot section 37. The forward path segment 102 is provided between a first and a second outer idler 112, 114 that are located at the outermost corners of the frame plate 130, along a common first longitudinal edge thereof, adjacent the front face of the first cavity plate assembly 63, and wherein the forward path segment 102 is parallel to the front face of the first cavity plate assembly 63 and is closely spaced thereto such that a slide 70 attached to the forward path segment 102 may translate freely across the face of the first cavity plate assembly 63.

Similarly, the rear path segment 104 is arranged behind the forward path segment 102, between the second outer idler 104, the belt 101 having wrapped around half the circumference thereof, and a rear idler 116 that is located in close proximity, and slightly inwardly staggered from, the first outer idler 112, such that the rear path segment 104 is arranged parallel to the forward path segment 102 and spaced therefrom by a distance equal to the diameter of the second outer idler 114. In so doing, the rear path segment 104 should also be parallel to the front face of the first cavity plate assembly 63 and still be closely spaced thereto such that a slide 70 attached to the rear path segment 104 may also translate freely across the face of the cavity plate assembly 63.

The span of the forward and rear path segments 102, 104, and hence the position of the first outer idler 112, second outer idler 114, and the rear idler 116, must be sufficient to allow the slides 70 attached thereto to translate fully between the inboard and outboard positions.

Similarly, a forward and a rear path segment 102, 104 are also provided to drive the pair of slides 70 positioned adjacent a front face of a second cavity plate assembly 63 on the opposite side of the mold hot section 37. Accordingly, the forward and rear path segment 102 104 are arranged between a first and a second outer idler 112, 114, and a rear idler 116 in a similar manner except that they are located at the outermost corners of the frame plate 130, along a common second longitudinal edge thereof, adjacent the front face of the second cavity plate assembly 63.

The driving path segment 106 extends between the rear idlers 116 on either side of the frame plate 130 via the driving gear 110. The belt 101 engages a circumferential portion of the driving gear such that, in use, a rotation of the driving gear 110 drives the belt 101 engaged therewith.

The return path segment 108 extends between the first outer idlers 112 adjacent the first and the second cavity plate assembly 63 for closing the belt 101 into an endless loop.

It is important to the proper operation of the in-mold lid handling system 59 that the belts 101 be properly tensioned such that the slides may be translated between the inboard and outboard positions without sagging such that the suction cups 71 on the slides 70 are properly aligned with the lids 12 for retrieval thereof in the inboard position, and that the lids 12 may be subsequently positioned within the drop chutes 77. Those skilled in the art would appreciate that there are many suitable ways to tension a belt. For instance, one or more of the belt idlers 112, 114, 116 could be mounted to an adjustable eccentric mount. With reference to the upper transmission 100 shown in FIG. 5, and as shown in greater detail with reference to FIGS. 6A and 6B, the tensioning of the belt 101 can also be accomplished by mounting the second outer idlers 112 on a separate tensioning block 148 that can be adjustably positioned relative to the upper frame plate 130. The structure and the operation of the tensioning assembly will be provided in further detail hereinafter.

With reference to FIGS. 3A, 3B, 3C, & 5, the slides 70 are shown clamped to the belt 101, although those skilled in the art would appreciate that there are many other suitable means to attach the slides 70, such as fasteners or adhesive. In the present embodiment, the slides 70 are mounted to the belt 101 through the use of small rectangular blocks, called spanners 120, 122, that are fastened to back face of the slide 70, at the ends thereof, the width of the spanner chosen such that the slides 70 can be appropriately spaced from the front face of the cavity plate assembly 63, as described hereinbefore. Accordingly, there is relatively slim forward spanner 120 used to fasten a first slide 70 to the forward path segment 102, and a much wider rear spanner 122 to attach the second slide 70 to the rear path segment 104 such that both slides 70 are positioned on a common plane that is parallel to the front face of the cavity plate assembly 63. Both the rear and the forward spanners 120, 122 also include a shallow horizontal slot across the back face thereof for providing a belt pocket 128 that is large enough to accommodate the belt 101, but shallow enough such that that the belt is slightly compressed therein by a small rectangular clamping block 124 fastened to the back thereof. Accordingly, fine adjustment and alignment of the slides 70 between the belts 101 of the upper and lower transmissions 100, 100' can be made simply by releasing the clamp by loosening the clamping block 124, repositioning the slide 70, and then re-clamping the belt. The rear spanner 122 also includes a horizontal slot across the front face thereof for providing a belt clearance cutout 126 that is large enough to provide a clearance space around the forward path segment 102 when the second slide 70 is clamped to the front face of the rear spanner 122, such that the rear spanner 122 does not interfere with the travel of the forward path segment 102 as the rear spanner 122 travels with the rear path segment 104.

Generally, the weight of the slides 70, including the spanners 120, 122, clamping blocks 124, and the lids 12 retained thereon, is not appreciable and with the proper tensioning of the belt 101 no further guidance of the slide 70 is required. However, for the sake of larger or heavier lids 12, further guidance of the slides 70 could be provided. For instance, the top and bottom faces of the spanner 120, 122 and/or clamping blocks 124 could be used as guiding faces that cooperate with a top face 124 of the frame plate 130 and a the bottom face 147 of a transmission cover plate 162, as shown in FIG. 6. Those skilled in the art would understand that other suitable guiding means could be substituted.

The in-mold lid handling system 59, as shown in FIGS. 3A, 3B, & 3C, also includes a pair of drop chutes 77 that are preferably located adjacent each cavity plate assembly 63, as described hereinbefore. Preferably, the drop chutes 77 are mounted to the hot runner 62 through the use of chute piston assemblies 78 that allow the drop chutes 77 to be reciprocated between a retracted and a forward position relative to a front face of the cavity plate assembly 63. The reciprocation of the drop chutes 77 assists in clearing the lids 12 away from the slide suction cups 71 such that they may drop freely along the drop chutes 77. Accordingly, the process of transferring the lids 12 from the injection mold to the drop chutes 77, described hereinbefore, may further include the steps of: positioning of the drop chutes 77 into a retracted position for receiving the lids 12 being held on the slide suction cups 71, as shown at reference symbol A in FIG. 7; advancing the drop chutes 77 into a forward position as the lids 12 are being released from their suction cups 12, as shown at reference symbol B in FIG. 7.

Figure 5:
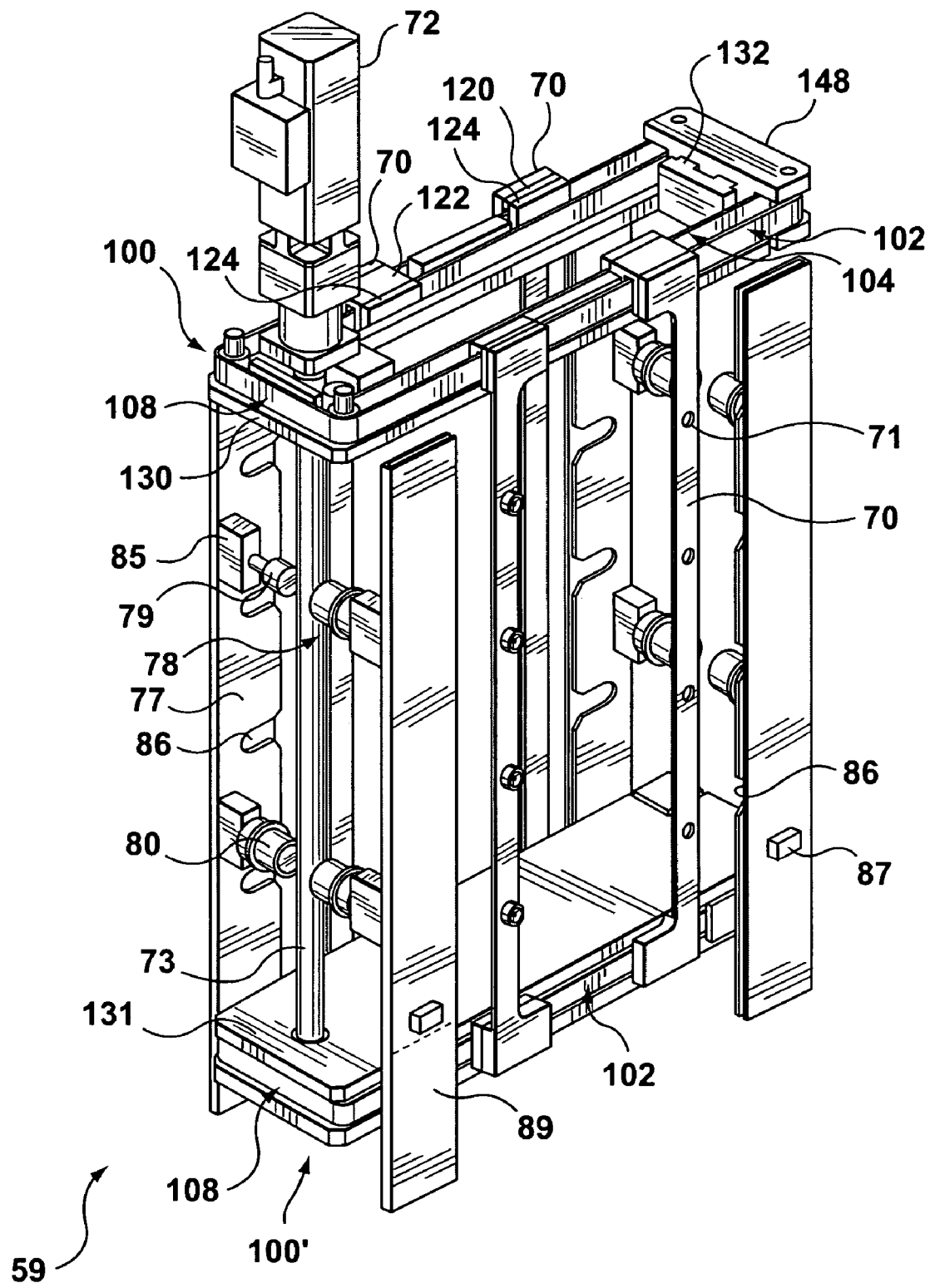
FIG. 5 is a perspective view, showing the top and sides of the in-mold lid handling system of the present invention in accordance with FIG. 3A, 3B, & 3C, further including a variant upper frame plate with belt tensioning block and drop chutes with gate piston assemblies installed.

The structure of each chute piston assembly 78, as shown with reference to FIG. 5, includes a spacer block 85 attached to the back face of the drop chute 77, the spacer block 77 having a piston 79 extending therefrom for reciprocation within a piston housing 80 installed in the hot runner 62, as shown in FIG. 3A, 3B, or 3C. An appropriate air circuit (not shown) is provided in the hot runner 62 for operating the chute piston assembly 78. The chute piston assembly 78 may be spring biased such that the drop chutes 77 are biased into the forward position.

Figure 7:
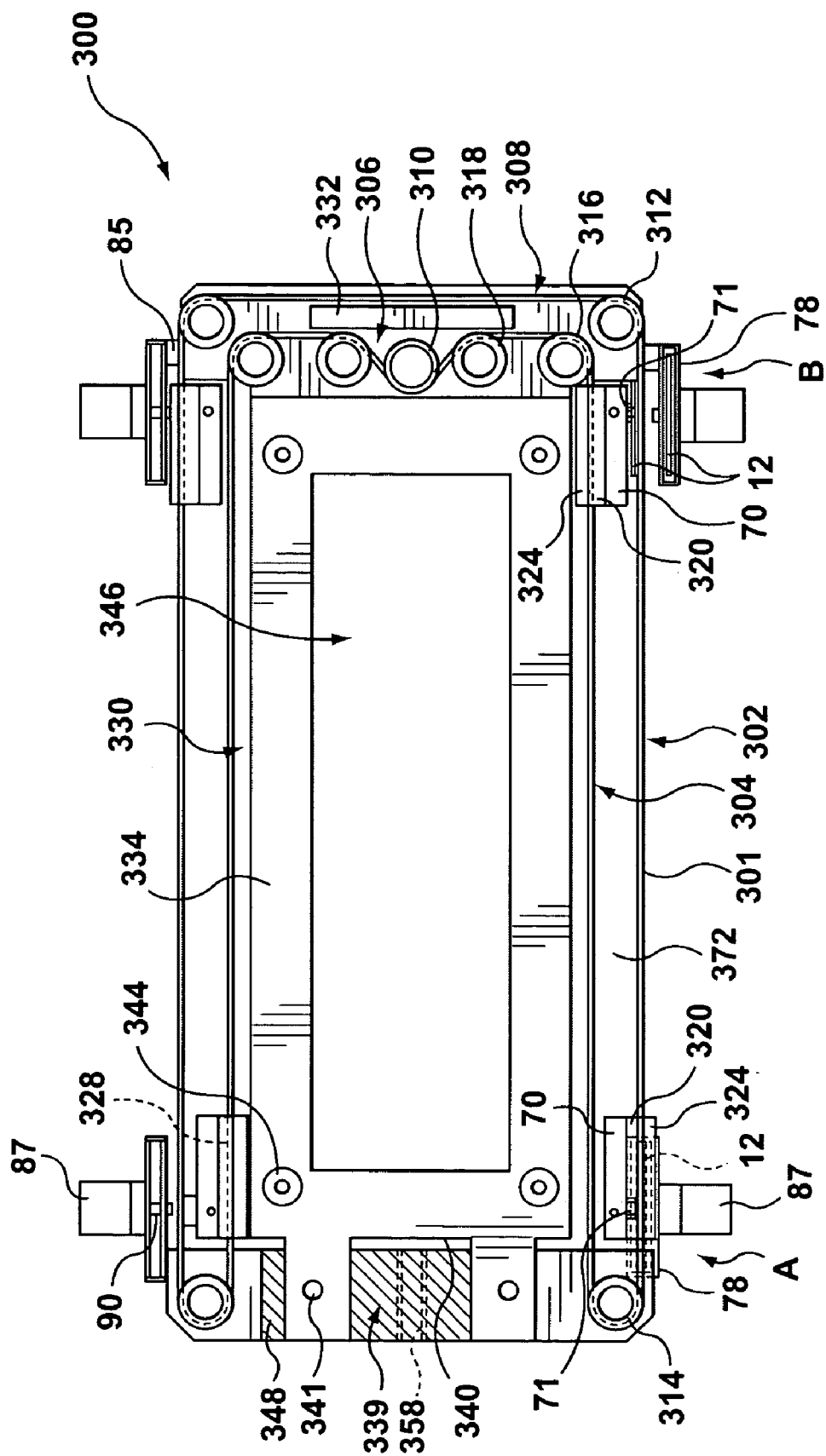
FIG. 7 is a plan view of a in-mold lid handling system in accordance with a preferred embodiment of the present invention.

Additional means of controlling the egress of lids 12 from the drop chutes 77 may also be provided, such as with a gate piston assembly 87 installed at a lower end of each drop chute 77, as shown in FIGS. 5 and 7. Control over the flow of lids 12 from the drop chutes 77 may be used, for example, to sequence the flow of lids 12 from drop chutes 77 sharing a common lid conveyor 91, 92, 93, or 94, as is the case with the lid molding system shown in FIG. 1. The gate piston assembly 87, as shown in FIG. 7, includes a gate piston 90 that can be positioned to extend into the open channel of the drop chute 77 to block the flow of the lids 12 therethrough. The gate piston may be operated by an electrical solenoid, pneumatic cylinder, or any other suitable means that would be evident to those skilled in the art.

Alternatively, a bottom portion of the drop chute 77 may be provided by a separate drop chute extension 89, as shown in FIG. 5, that is fixed to the lower transmission 100' and does not reciprocate with drop chute 77 but rather is aligned therewith when the drop chute 77 is in the forward position. Hence, when the injection mold 36 is closed, and the drop chutes 77 are positioned in the forward/drop position, the gate pistons may be sequenced to allow for the passage of the molded articles from the drop chutes 77, and through the chute extension 89 and into the auxiliary process.

The in-mold lid handling assembly 59 shown in FIG. 5 is consistent with the first embodiment described hereinbefore, and therefore includes an upper and a lower transmission 100, 100', the handling system 59 being configured for installation onto the mold hot section 37 of FIG. 1. The driving shaft 73 is clearly shown as extending through the upper transmission 100 and into the lower transmission 100', the drive shaft being coupled to the servo motor 72 that is itself mounted to the cover plate 162 (not shown) of the upper transmission. Accordingly, the hot runner 62, of the mold hot section 37, also includes a passage (not shown) extending from the upper to the bottom face thereof for accommodating the driving shaft 73. Furthermore, the upper and lower frame plates 130, 131, of the upper and lower transmissions 100, 100', have been configured to accommodate a tensioning block 148 for the tensioning of the belts 101.

Figure 6A:
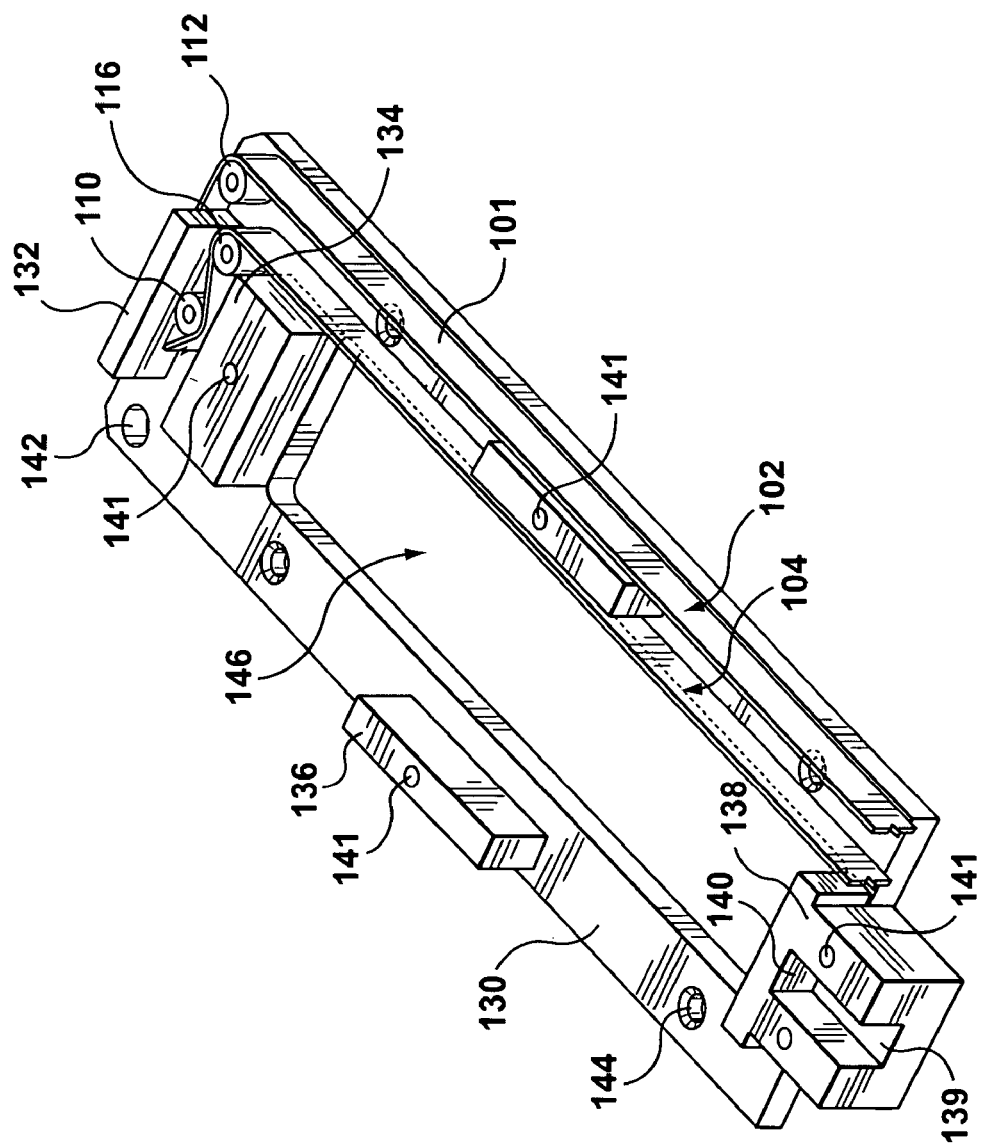
FIG. 6A is a perspective view, showing the upper frame plate in accordance with the in-mold lid handling system of FIG. 5.
Figure 6B:
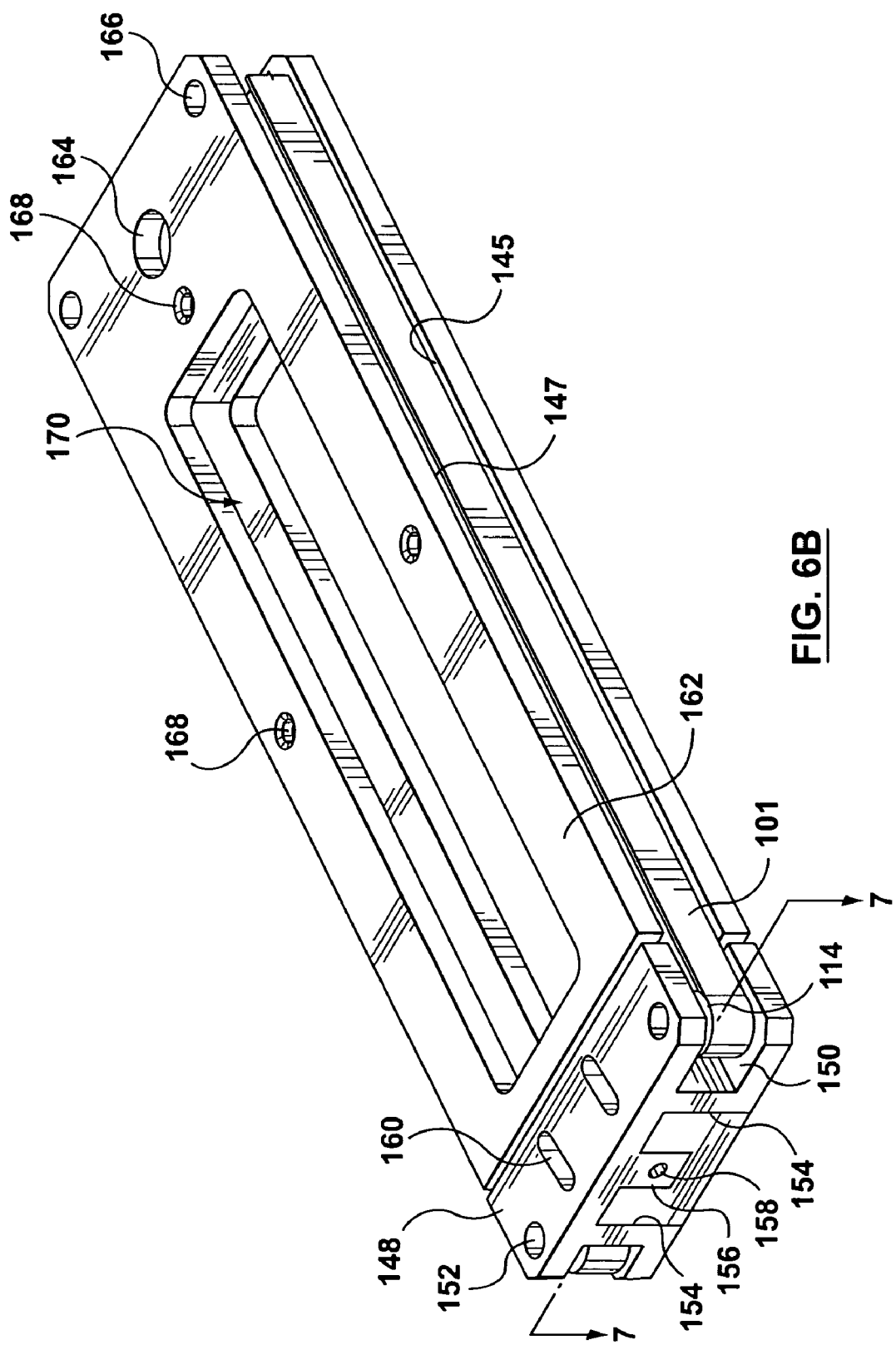
FIG. 6B is a perspective view, of an upper transmission in accordance with the in-mold lid handling system of FIG. 5.

In particular, and with reference to FIGS. 6A and 6B, the structure of the upper frame plate 130 is shown as including a plurality of bearing blocks 132, 134, 136, 138, a co-planar top surface of each adapted for receiving and securing of the transmission cover plate 162. A first bearing block 132 and a second bearing block 134 are provided as rectangular projections located on either side of a shaft hole 164 that extends through the upper frame plate 130, and is located on the horizontal centerline and near a first end of the upper frame plate 130. The shaft hole 164 is provided for receiving a bushing (not shown) or otherwise guiding the driving shaft 73 (not shown). Accordingly, the first and second bearing blocks 132, 134 are located directly beneath the servo motor (not shown) and hence provide a rigid mounting structure for the cover plate 162 and the servo motor 72 mounted thereon. The third bearing block 136 is provided as two rectangular projections located between the belt pathways of the forward and rear path segments 102, 104, the rectangular projections of the third bearing block 136 are therefore parallel to the longitudinal axis of the frame plate, and are bisected by a centreline thereof. The frame plate also includes: bushing installations 142 for the first outer idler 112 and the rear idler 116; various fastener recesses 144 for the mounting of the frame plate 130 to the top face of the hot runner 62 through the use of fasteners such as screws (not shown); and various tapped holes 141 on the top of the bearing blocks 132, 134, 136, 138 for cooperation with fasteners for retaining the transmission cover plate 162 and the tensioning block 148. The fourth bearing block 138 is provided as a rectangular projection from the upper frame plate 130, and is located at the opposite end of the frame plate 130 from the first and second bearing blocks 132, 134, and is furthermore centered on the longitudinal centerline of the upper frame plate 130. The fourth bearing block 138 also includes a shallow rectangular slot 139 that extends through a top face of the fourth bearing block 138 and along the longitudinally centerline of the upper frame plate 130 from an outer side face of the fourth bearing block 138 and through a substantial portion thereof. The slot 139 is configured for receiving a boss 156 of the tensioning block 148, as shown in FIG. 6B, for aligning and guiding the tensioning block 148 for the purposes of belt 101 tensioning. Accordingly, an adjustment screw (not shown) engaged within a threaded hole 158, that extends longitudinally through the boss 156, is of a sufficient length to engage a back tensioning face 140 of the slot 139 in the fourth bearing block 138. For adjusting the belt 101 tension, the adjustment screw (not shown) can be tightened with its end engaging the tensioning face 140 to push the tensioning block 148 longitudinally away from the upper frame plate 130. Once adjusted, the tensioning block 148 is clamped to the fourth bearing block to guard against any relative movement and a possible loss of belt tension. The clamping is provided by fastening the tensioning block 148 to the fourth bearing block 138 through the use of fasteners (not shown) that extend through a pair of longitudinally directed slots 160, provided through an upper member of the tensioning block 148, to engage the tapped holes 141 in the fourth bearing block 138, and the heads of the fasteners being engaged against the top surface of the tensioning block 148.

The structure of the tensioning block 148 is essentially a rectangular body that includes a 'U'-shaped slot 154 that extends across its transverse centerline, the slot 154 being oriented such that the base of the 'U'-shaped slot is parallel to a bottom face of the rectangular member. The 'U'-shaped provides a complementary form to that of the fourth bearing block 148 and provides at its center the projecting boss 156 for engaging the slot 139 for purposes discussed hereinbefore. The tensioning block 148 also includes a pair of outer slots 150 that are located at opposite ends thereof. The outer slots 150 are configured such that they extend through each of a front, back and side faces of the rectangular member and thereby form a pair of horizontally projecting top and bottom flanges that are further adapted to include bushing 152 installations for the second outer idlers 114.

The transmission cover plate 162 is shown with reference to FIG. 6B and includes: complementary bushing 166 installations for the first outer idler 112 and rear idler 116 (not shown); a shaft hole 164 (upper frame plate 130 only) for accommodating the driving shaft 73; various fastener recesses for mounting of the cover plate 162 to the second, and third bearing blocks 134, 136 of the upper frame plate 130; and a mold services cutout 170 for purposes described hereinbefore.

In accordance with a second embodiment of the in-mold part handling system 59, as shown in FIGS. 4A & 4B, the handling system 59 includes an upper and a lower transmission 200, 200'. Each transmission 200, 200' includes a series of belts 201, 203, 206. In particular, each slide 70 has a dedicated driven belt 201, 203, and wherein adjacent driven belts 201, 203 are interconnected through the use of a reversing gear arrangement. Accordingly, adjacent each cavity plate assembly 63 the first driven belt 201 operates a first slide 70, and the second driven belt 203 operates the second slide 70, the slides 70 being driven in opposite directions such that the slides 70 converge towards the inboard position for retrieving the lids 12 from the injection mold 36 and diverge towards the outboard position for engaging and releasing of the lids 12 into the drop chutes 77. The driven belts 201, 203, adjacent the first and second cavity plate assemblies, are themselves driven by a driving belt 206 that interconnects with the driving gear 210 of the driving shaft 78.

In further detail, a first and a second driven belt 201, 203 is provided along each longitudinal edge of the upper frame plate 230, and wherein each of the first and the second driven belts 201, 203 are longitudinally aligned and extend across substantially one half of the length of the upper frame plate 230. Furthermore, the first and the second driven belts 201, 203 each include a forward and a rear path segment 202, 204 that are arranged to be parallel and closely spaced to a front face of the cavity plate assembly 63.

In particular, the first driven belt 203 extends between an outer idler 212, positioned in a corner of the upper frame plate 230 beyond the outboard position of the drop chute 77, to an inner driving idler gear 214 that is positioned near the middle of the upper frame plate 230 and adjacent an edge thereof, such that the forward and rear path segments 202, 204 are parallel to the front face of the cavity plate assembly, for reasons described hereinbefore.

Similarly, the second driven belt 203 extends from another outer idler 212, positioned along the same edge of the upper frame plate 230 but in an opposite corner thereof, and an inner driven idler gear 216 positioned immediately adjacent the inner driving idler gear 214, and again wherein the front and rear path segments 202, 204 are parallel to the front face of the cavity plate assembly.

The inner driving idler gear 214 is characterized in that it has a lower belt engaging portion for driving the first driven belt 201, a middle gear portion for engaging the adjacent inner driver idler gear 216, and a upper belt engaging portion for engagement with the driving belt 206. Similarly, the inner driven idler gear 216 is characterized in that it has a lower belt engaging portion for driving the second driven belt 203, and an upper gear portion for engaging the complementary gear portion of the adjacent inner driving idler gear 214. The intermeshed gear portions of the inner driving idler gear 214 and the inner driven idler gear 216 provide the reversing gear described hereinbefore.

The driving belt 206 connects the driving idler gears 214 adjacent the first and the second cavity plate assemblies 63 with the driving gear 210 of the driving shaft 73. The path of belt 206 also preferably extends around a pair of auxiliary idlers 218, located near the center of the upper frame plate 230, to ensure adequate circumferential engagement of the belt 206 with the driving gear 210.

In the present embodiment, the belt clamping structure is identical for the slides 70 attaching to first driven belts 201 as it is for those attaching to the second driven belt 203, as this belt configuration allows all slides 70 to be attached to the forward path segments 202. Hence the spanners 220 and the clamping blocks 224 are identical for each and every slide 70 clamp.

As described previously, proper tensioning of the belts 201, 203, 206 is required. Accordingly, each belt 201, 203, 206 may be tensioned in the manner described hereinbefore, such as through the use of eccentrically mounted idler bushings (not shown), or through other suitable means evident to those skilled in the art.

The in-mold handling system 59 is also shown as including drop chutes 77 positioned adjacent each cavity plate assemblies 63, that may be operated in the manner described hereinbefore.

In accordance with a preferred embodiment of the in-mold part handling system 59, the handling system 59 includes an upper and a lower transmission 300, 300', as shown in FIG. 7. The structure and operation of the transmissions 300, 300' is nearly identical to first embodiment of the transmission 100, 100', as shown in FIG. 5. Accordingly, the description of the structure and the operation of the transmission 300, 300' will not be repeated, for the sake of comparison, the corresponding components have been given similar reference numbers.

A notable difference in the belt 301 configuration is the addition of auxiliary idlers 318 that are located on either side of the driving gear 310, such that the belt 301 has increased circumferential engagement therewith. Adequate circumferential engagement between the belt 301 and the driving gear 310 is essential to avoid relative belt slipping and hence a loss of alignment between the slides 70 and the core inserts 65, in the inboard position, and the drop chutes 77, in the outboard position.

Another difference is the manner in which the slides 70 attach to the belt 301. In particular, the slides 70 are advantageously clamped to the forward and rear belts segments 302, 304 using identical spanners 320 and clamping blocks 324. Accordingly, the pair of slides 70 adjacent each cavity plate assembly 63 are attached to the forward and rear path segments 302, 304 respectively, as before, however, the slides 70 attach behind and in front of the front and rear path segments 302, 304, respectively, such that they are arranged to translate therebetween. Preferably, a slide cutout 372, or similar recess, is provided through the upper frame plate 330 directly beneath the forward and rear belt section 302, 304 and between the first outer idler 312 and the second outer idler 114 to allow the slides 70 to extend past the upper frame plate 330 and to engage the forward and rear path segments 302, 304. As before, the spanner 320 is a slim rectangular block configured for mounting to the ends of the slides 70 for positioning the slides 70 relative to a front face of the cavity plate assembly 63 such that they may translate freely there across. And as previously, the spanner 320 includes a longitudinally extending slot across a face thereof that provides a belt pocket 328 for accommodating the belt 301 to be clamped therein by the clamping block 324. Furthermore, the spanner 320 mounts to a front face of the slide 70 that attaches to the forward path segment 302, and to a back face of the slide 70 that attaches to a rear path segment 304.

The tensioning of the belt 301 is provided in an identical manner to that disclosed previously. In particular, the frame plate includes a main bearing block 334 with an end portion 338 that is configured to receive a tensioning block 348. The tensioning block is shown in section, as taken along section line 7—7 in FIG. 6B. The end portion 338 of the main bearing block 334 and the complementary tensioning block 348 are identical to the fourth bearing block 138 and tensioning block 148 shown in FIG. 6B. Accordingly, the main bearing block 334 includes a shallow rectangular slot 339 that extends through a top face of the main bearing block 334 and along the longitudinally centerline of the upper frame plate 330 from an outer side face of the main bearing block 334 and through a substantial portion of the end portion 338. The slot 139 is configured for receiving a boss 356 of the tensioning block 348. Similarly, an adjustment screw (not shown) engaged within a threaded hole 358, that extends longitudinally through the boss 356, is of a sufficient length to engage a back tensioning face 340 of the slot 339. The tension in the belt 301 may be adjusted as described hereinbefore by adjustment of the screw (not shown). Once adjusted, the tensioning block 348 is clamped to the main bearing block 334 through the use of fasteners (not shown) that extend through the tensioning block 348 and into the tapped holes 341 formed in the end portion 338.

The upper frame plate 330 of the transmission 300, as shown in FIG. 7, further includes fastener recesses 344 for connecting the upper frame plate 330 to the upper surface of the hot runner 62 (not shown), and also includes tapped holes 341 for retaining a transmission cover plate (not shown).

In all of the foregoing embodiments, an advantageous variant to the use of suction cups 71, on the slides 70, is provided wherein a thin-walled tubular member (not shown) is arranged to surround each suction cup 71 to orient the lid 12 held thereon. In particular, the tubular member is to be configured such that there is a small annular gap between its inner wall and an outer rim of the suction cup 71, and that the tubular member is slightly shorter than the suction cup 71. In operation, the suction cup 71 and the tubular member cooperate whereby the coupling function of the suction cup 71 is not impeded by the tubular member and that a top surface of the tubular member provides a supporting surface for the lid 12 and thereby orients the lid 12 therewith. Furthermore, the top surface may be arranged to be parallel to the front face of the slide 70 to ensure the edgewise alignment of the lid 12 with the drop chute 77, in the outboard position of the slide 70.

While the in-mold article handling system 59 of the present invention has been described in the context of a lid handling system for use with a four-level stack mold 36, those skilled in the art would understand that the advantages provided through the use of the present invention may be extended to other applications by the simple reconfiguration of the handling system 59.

In particular, the in-mold article handling system could be configured for use with other configurations of stack injection molds 36 (e.g. two or three-level) or to a single molding face injection mold 36 producing lids or any other molded article.

The in-mold article handling system could be configured for mounting onto the core plate assembly 60, 61 for retrieving molded articles 12 from either of the core molding inserts 65 or cavity molding insert 67.

The in-mold article handling system could be used to place molding inserts (e.g. labels) into the molding cavities.

The in-mold article handling system does not require drop chutes 77 and furthermore the handling system could be re-oriented such that the slides 70 translate vertically across the molding face 81.

The transmission 100, 200, 300 could be reconfigured to operate a plurality of swing-chutes, as generally described in U.S. Pat. No. 5,518,387, with a single servo motor.

The in-mold article handling system does not require the use of belts 101, 201, 301, but may otherwise use bands, cables, chains, or any other suitable means evident to those skilled in the art.

The in-mold article handling system could be configured such that the manner in which the slides 70 attach to the belts 101, 201, 203, 301 would allow the slides 70 to follow the belts 101, 201, 203, 301 around at least a portion of the circumference outer idlers 112, 114, 212, 312, 314, preferably by 90°, such that the slides 70 travel through a corresponding arc about the center of the outer idlers 112, 114, 212, 312, 314 and are thereby positioned, in the outboard position, generally parallel to a side of the hot runner 62, or whatever mold section the in-mold article handling system is attached. Accordingly, the drop chutes 77 could also be placed along the corresponding side and hence provide more space across the molding face for larger molding cavities or to simply provide an alternate orientation of the molded articles for coupling with an auxiliary process.

While three variants for the belt paths have been described herein, those skilled in the art would understand that other alternative belt configurations exist and that the scope of the present invention is not limited to those embodiments described hereinbefore.

All U.S. and foreign patent documents discussed above are hereby incorporated by reference into the Detailed Description of the Preferred Embodiment.

The individual components shown in outline or designated by blocks in the attached Drawings are all well-known in the molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An in-mold article handling system configured for mounting to a first mold section, the first mold section including at least one plate assembly provided on a first side thereof, the at least one plate assembly including at least one molding cavity portion disposed therein that has an opening arranged through a front face thereof, the in-mold article handling system comprising:

at least one slide provided by an elongate rail with a plurality of article retention devices configured on a front face thereof, in use, for engaging articles for transport;

a first and a second transmission connected at generally opposite ends of the at least one slide, the transmissions cooperating, in use, to translate the at least one slide across a front face of the at least one plate assembly between: an inboard position, that is adjacent said at least one molding cavity portion, to perform a first operation; and an outboard position, that is laterally spaced from the front face of the at least one plate assembly, to perform a second operation;

a motive means for driving the first and second transmission;

the first and second transmissions each including:
a frame plate;
at least one flexible linking means contained therein that is configured along a path;
a plurality of guides mounted to a top face of the frame plate that defines the path;
the path including a plurality of path segments defined between the guides;
a driving member that couples the motive means with the at least one flexible linking means for operating same, in use, along the path between a first and a second position; and
wherein the at least one slide attaches to the at least one flexible linking means along one of the path segments to be driven therewith and as such, in use, when the at least one flexible linking means is operated along the path between the first and the second position the at least one slide is correspondingly operated between the inboard and the outboard positions respectively.

2. The in-mold article handling system in accordance with claim 1, wherein:
the path segments of the at least one flexible linking means includes a forward path segment, a rear path segment, a driving path segment, and a return path segment;
a first slide of the at least one slide is attached to the forward path segment;
a second slide of the at least one slide is attached to the rear path segments; and
wherein the flexible linking means path is configured such that the forward and rear path segments are arranged to operate in generally opposite directions.

3. The in-mold article handling system in accordance with claim 2, wherein:
the plurality of guides includes a first and a second outer guide that are located at the outermost corners of the frame plate, along a common first longitudinal edge thereof, adjacent the front face of the at least one first plate assembly, in use, being parallel and in close proximity to the front face of the at least one plate assembly;
the forward path segment is provided between the first and the second outer guide; and
wherein the forward path segment is parallel to the front face of the at least one plate assembly and is closely spaced thereto such that the first slide attached thereto may translate freely across the front face of the at least one plate assembly.

4. The in-mold article handling system in accordance with claim 3, wherein:
the plurality of guides also includes a rear guide located in close proximity, and slightly inwardly staggered from the first outer guide;
the rear path segment is provided behind the forward path segment, between the second outer guide and the rear guide; and
wherein the rear path segment is arranged parallel to the forward path segment and spaced therefrom by a distance equal to the diameter of the second outer guide, the rear path segment being parallel to the front face of the at least one plate assembly and is closely spaced thereto such that the second slide attached thereto may translate freely across the front face of the at least one plate assembly.

5. The in-mold article handling system in accordance with claim 4, wherein:
the at least one plate assembly of the first mold section includes a second plate assembly that is provided on a second side of the first mold section, the second plate assembly including at least one molding cavity portion disposed therein that has an opening arranged through a front face thereof; and
a further forward and rear path segment is arranged between a first and a second outer guide that are located at the outermost corners of the frame plate, along a common second longitudinal edge thereof, and a rear guide located in close proximity, and slightly inwardly staggered from the first outer guide and being located on a same end of the frame plate as the rear guide of the first plate assembly;
wherein the forward and rear path segments are parallel to the front face of the second plate assembly and are closely spaced thereto such that a further first and second slide attached thereto, respectively, may translate freely across the front face of the second plate assembly.

6. The in-mold article handling system in accordance with claim 4 or 5, wherein:
the span of the forward and rear path segments, and hence the position of the first outer guide, second outer guide, and the rear guide must be sufficient to allow the first and second slides attached thereto to translate fully between the inboard and outboard positions.

7. The in-mold article handling system in accordance with claim 4 or 5, wherein:
the plurality of path segments includes a driving segment that is extends between the rear guides and around the driving member.

8. The in-mold article handling system in accordance with claim 7, wherein the plurality of guides further includes an auxiliary guide located between each of the first outer guide and the driving member.

9. The in-mold article handling system in accordance with claim 7, wherein:
the plurality of path segments includes a return segment that is extends between the first outer guides.

10. The in-mold article handling system in accordance with claim 1, wherein:
the at least one flexible linking means includes a first and a second driven flexible linking means provided along a first longitudinal edge of the frame plate;
each of the first and the second driven flexible linking means are longitudinally aligned and extend across substantially one half of the length of the first longitudinal edge of the frame plate;

the first and the second driven flexible linking means are interconnected through the use of a reversing gear arrangement;

the first and the second driven flexible linking means each include a forward and a rear path segment that are arranged to be parallel and closely spaced to a front face of the at least one plate assembly;

wherein a first and a second slide of the at least one slide attaches to the forward path segment of the first and second driven flexible linking means respectively to be driven therewith and as such, in use, when the first driven flexible linking means is operated along the path between the first and the second position, the second driven flexible linking means is operated in the opposite direction, and the first and the second slides are correspondingly operated between the inboard and the outboard positions respectively.

11. The in-mold article handling system in accordance with claim 10, wherein:

the first driven flexible linking means extends between an outer guide, located at an outermost corner of the frame plate, and an inner driving guide gear located near the middle of the frame plate, along a common first longitudinal edge thereof, such that the forward and rear path segments are parallel to the front face of the at least one plate assembly.

12. The in-mold article handling system in accordance with claim 11, wherein:

the second driven flexible linking means extends between an outer guide, located at an the opposite outermost corner of the frame plate, and an inner driven guide gear located immediately adjacent the inner driving guide gear, along a common first longitudinal edge thereof, such that the forward and rear path segments are parallel to the front face of the at least one plate assembly;

wherein the inner driving guide gear is characterized in that it has a lower flexible linking means engaging portion for driving the first driven flexible linking means, a middle gear portion for engaging the adjacent inner driver guide gear, and a upper flexible linking means engaging portion for engagement with a driving flexible linking means, similarly, the inner driven guide gear is characterized in that it has a lower flexible linking means engaging portion for driving the second driven flexible linking means, and an upper gear portion for engaging the complementary gear portion of the adjacent inner driving guide gear, the intermeshed gear portions of the inner driving guide gear and the inner driven guide gear provide the reversing gear.

13. The in-mold article handling system in accordance with claim 12, wherein:

the at least one plate assembly of the first mold section includes a second plate assembly that is provided on a second side of the first mold section, the second plate assembly including at least one molding cavity portion disposed therein that has an opening arranged through a front face thereof; and a further first driven flexible linking means extends between an outer guide, located at an outermost corner of the frame plate, and an inner driving guide gear located near the middle of the frame plate, along a common second longitudinal edge thereof, such that the forward and rear path segments are parallel to the front face of the second plate assembly;

a second driven flexible linking means extends between an outer guide, located at an the opposite outermost corner of the frame plate, and an inner driven guide gear located immediately adjacent the inner driving guide gear, along a common second longitudinal edge thereof, such that the forward and rear path segments are parallel to the front face of the second plate assembly;

wherein the inner driving guide gear is characterized in that it has a lower flexible linking means engaging portion for driving the first driven flexible linking means, a middle gear portion for engaging the adjacent inner driver guide gear, and a upper flexible linking means engaging portion for engagement with a driving flexible linking means, similarly, the inner driven guide gear is characterized in that it has a lower flexible linking means engaging portion for driving the second driven flexible linking means, and an upper gear portion for engaging the complementary gear portion of the adjacent inner driving guide gear, the intermeshed gear portions of the inner driving guide gear and the inner driven guide gear provide the reversing gear.

14. The in-mold article handling system in accordance with claim 12 or 13, wherein:

the driving flexible linking means connects the driving member with the upper flexible linking means of the first driven guide gear.

15. The in-mold article handling system in accordance with claim 14, wherein:

the path of driving flexible linking means also preferably extends around a pair of auxiliary guides located near the center of the frame plate to ensure adequate circumferential engagement of the flexible linking means with the driving member.

16. The in-mold article handling system in accordance with claim 1, wherein the first operation is to retrieve at least one molded article, in use, from one of: i) the at least one molding cavity portion; or ii) from a complementary molding cavity portion disposed in a complementary plate assembly of a second mold section.

17. The in-mold article handling system in accordance with claim 16, further including at least one drop chute and being mounted to the first mold section in a location that coincides with the outboard position of each of the at least one slide, and arranged to be parallel therewith, and wherein the at least one drop chute is configured to receive, in use, the at least one molded article from the at least one slide.

18. The in-mold article handling system in accordance with claim 17, wherein the at least one drop chute is mounted to the first mold section through the use of at least one chute piston assembly that provides, in use, the ability to reciprocate the at least one drop chute between a retracted and a forward position relative to a front face of the at least one plate assembly to assist in clearing the molded articles away from the slide article retention devices.

19. The in-mold article handling system in accordance with claim 17, wherein the at least one drop chute further includes a means for controlling the egress of molded articles therefrom that is located at a lower end thereof.

20. The in-mold article handling system in accordance with claim 1, wherein the first mold section includes a hot runner and that the in-mold article handling system is configured for mounting thereon.

21. The in-mold article handling system in accordance with claim 1, wherein the first mold section includes a core plate assembly and that the in-mold article handling system is configured for mounting thereon.

22. The in-mold article handling system in accordance with claim 1, configured for servicing a plurality of plate assemblies.

23. The in-mold article handling system in accordance with claim 1, configured for servicing a single plate assembly.

24. The in-mold article handling system in accordance with claim 1, configured for use on a mold hot section of a stack injection mold.

25. The in-mold article handling system in accordance with claim 1, configured for use on a mold cold section of a stack injection mold.

26. The in-mold article handling system in accordance with claim 1, wherein the first operation is placing a label into the molding cavity portion, and the second operation is picking up a label.

27. The in-mold article handling system in accordance with claim 2, wherein the first and second slides are attached to the forward and rear path segments with the slides attached behind and in front of the front and rear path segments respectively, such that they are arranged to translate therebetween.

28. The in-mold article handling system in accordance with claim 16, wherein the first molded article is a lid.

29. The in-mold article handling system in accordance with claim 1, wherein the flexible linking means is selected from the group consisting of: i) a belt; ii) a chain; iii) a band, and iv) a cable.

30. The in-mold article handling system in accordance with claim 1, wherein the flexible linking means is tensioned by a tensioning block, with at least one of the plurality of guides provided therein, that is adjustably slidably connected to the frame plate.

31. The in-mold article handling system in accordance with claim 1, wherein the at least one slide is clamped to the flexible linking means using a spanners and an associated clamping blocks.

32. The in-mold article handling system in accordance with claim 1, wherein the motive means is a driving shaft that is being driven by a motor.

33. The in-mold article handling system in accordance with claim 32, wherein the driving member is a first and a second driving that are connected near the ends of the driving shaft for driving the first and second transmission respectively.

34. The in-mold article handling system in accordance with claim 32, wherein the first mold section includes a passage therethrough for accommodating the driving shaft.

35. The in-mold article handling system in accordance with claim 3, 11, or 17 wherein the at least one slide is attached to the flexible linking means to allow the at least one slide to follow the flexible linking means around at least a portion of the circumference outer guides, such that the at least one slide travels through a corresponding arc about the center of the outer guides and is thereby positioned in the outboard position, generally parallel to a side of the first mold section.

36. The in-mold article handling system in accordance with claim 35 wherein the drop chutes is located along the corresponding side of the first mold section for receiving the molded article.

37. An injection mold including at least one in-mold article handling system mounted to at least one mold section thereof, the at least one mold section including at least one plate assembly provided on a first side thereof, the at least one plate assembly including at least one molding cavity portion disposed therein that has an opening arranged through a front face thereof, the in-mold article handling system comprising:
　at least one slide provided by an elongate rail with a plurality of article retention devices configured on a front face thereof, in use, for engaging articles for transport;
　a first and a second transmission connected at generally opposite ends of the at least one slide, the transmissions cooperating, in use, to translate the at least one slide across a front face of the at least one plate assembly between: an inboard position, that is adjacent said at least one molding cavity portion, to perform a first operation; and an outboard position, that is laterally spaced from the front face of the at least one plate assembly, to perform a second operation;
　a motive means for driving the first and second transmission;
　the first and second transmissions each including:
　　a frame plate;
　　at least one flexible linking means contained therein that is configured along a path;
　　a plurality of guides mounted to a top face of the frame plate that defines the path;
　　the path including a plurality of path segments defined between the guides;
　　a driving member that couples the motive means with the at least one flexible linking means for operating same, in use, along the path between a first and a second position; and
　　wherein the at least one slide attaches to the at least one flexible linking means along one of the path segments to be driven therewith and as such, in use, when the at least one flexible linking means is operated along the path between the first and the second position the at least one slide is correspondingly operated between the inboard and the outboard positions respectively.

38. A transmission for use in a in-mold article handling system, that is configured for mounting to a first mold section of a mold, the first mold section including at least one plate assembly provided on a first side thereof, the at least one plate assembly including at least one molding cavity portion disposed therein that has an opening arranged through a front face thereof, the transmission comprising:
　a frame plate;
　at least one flexible linking means contained therein that is configured along a path;
　a plurality of guides mounted to a top face of the frame plate that defines the path;
　the path including a plurality of path segments defined between the guides;
　a driving member that couples, in use, to a motive means with the at least one flexible linking means for operating same, in use, along the path between a first and a second position; and
　wherein the transmission is configured such that, in use, at least one slide attaches to the at least one flexible linking means along one of the path segments to be driven therewith and as such when the at least one flexible linking means is operated along the path between the first and the second position the at least one slide is correspondingly operated between an inboard and an outboard positions respectively.

* * * * *